April 29, 1924.  
C. BONNAFFOUS ET AL  
MILLING CUTTER  
Filed Aug. 13, 1920  
1,492,505  
2 Sheets-Sheet 1

INVENTORS  
CHARLES BONNAFFOUS  
PIERRE BOZANNET  
BY  
ATTORNEYS

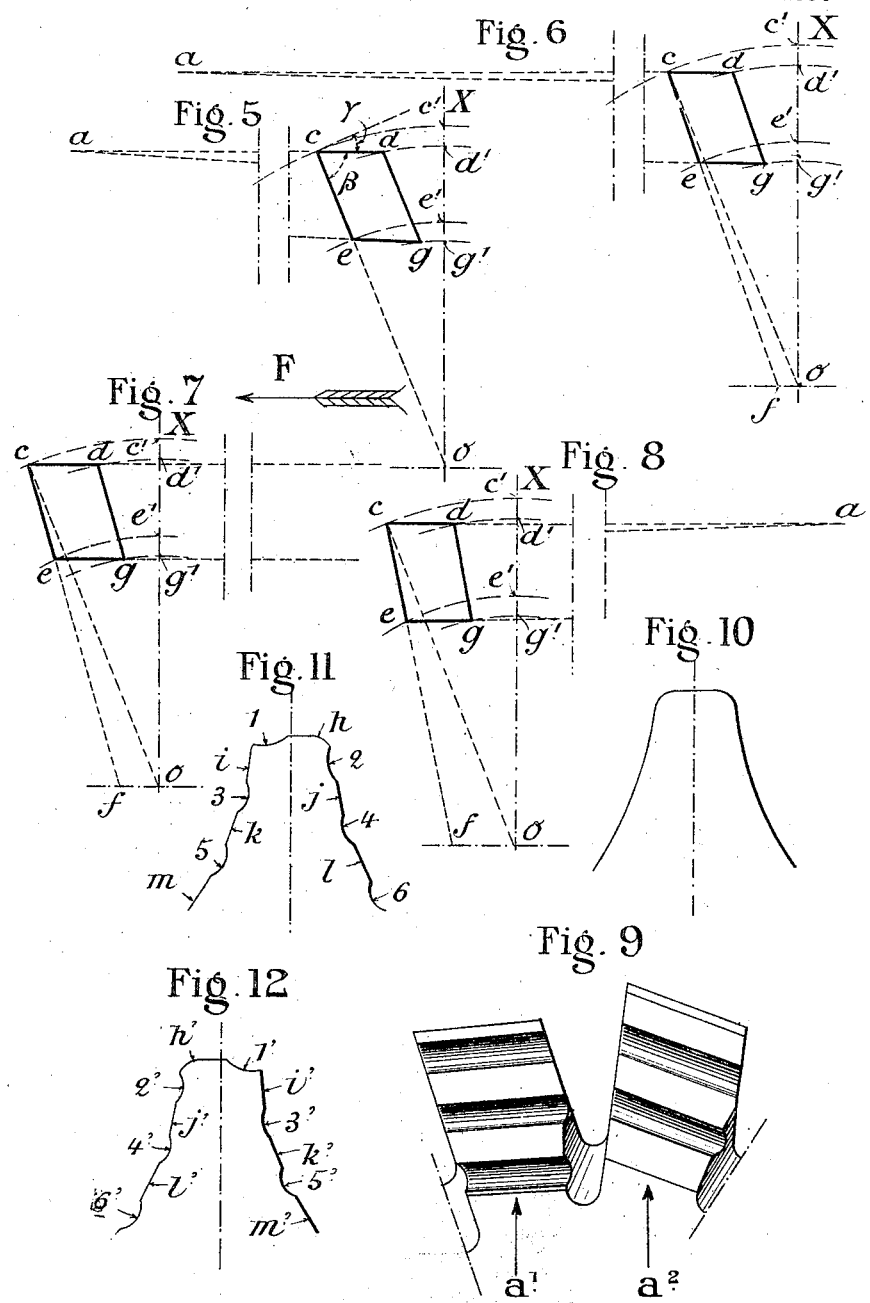

Patented Apr. 29, 1924.

1,492,505

UNITED STATES PATENT OFFICE.

CHARLES BONNAFFOUS AND PIERRE BOZONNET, OF ST.-OUEN, FRANCE.

MILLING CUTTER.

Application filed August 13, 1920. Serial No. 403,334.

*To all whom it may concern:*

Be it known that we, CHARLES BONNAFFOUS and PIERRE BOZONNET, manufacturers, of 36 and 38 Rue Blanqui, at St.-Ouen, Seine Department, in the Republic of France, and citizens of the Republic of France, have invented certain new and useful Improvements in Milling Cutters, of which the following is a specification.

This invention relates to milling cutters which are employed for the cutting of profiles, such as gear teeth and the like. It consists in a method whereby a special configuration is given to the outer surface of the milling cutter teeth for the purpose of obtaining sharpness in the cutting work performed by the teeth, facility of penetration of the teeth into the work, a good profile from the milling cutter, and conditions involving a practically constant profile of the cut surfaces whatever may be the amount of wear of the milling cutter due to successive sharpenings of the same, within certain limits.

This configuration is in principle that of a conoidal surface which is generated by a movable straight line remaining parallel to a plane perpendicular to the axis of the milling cutter but sliding on the one hand upon a fixed straight line parallel to this axis and on the other hand upon a fixed profile whose shape depends upon the profile of the work to be cut. A configuration of this kind can be readily obtained by simple mechanical means.

The accompanying drawings which are given by way of example show three forms of construction of this invention.

Figs. 5 to 8 are diagrammatic views similar to Fig. 3, relative to different positions of the rectilinear directrix.

Fig. 9 is a partial elevation of this cutter, showing two consecutive teeth.

Fig. 10 is a projection, on a plane parallel to the cutting face, of the profile of a tooth of this cutter in case it were not cut out.

Fig. 11 is a similar projection of the profile of the tooth $a^1$ of the cutter.

Fig. 12 is a similar projection of the profile of the tooth $a^2$.

Figure 1:
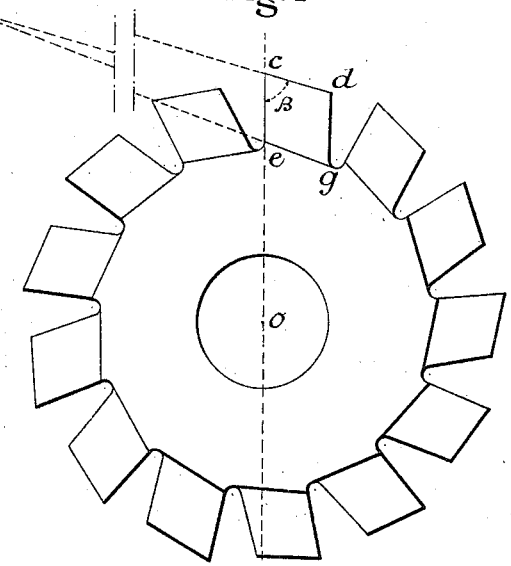
Fig. 1 is an elevation of the first form of the milling cutter.
Figure 2:
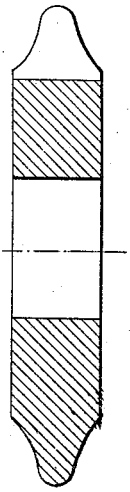
Fig. 2 is a cross-section of the same.
Figures 3, 4:
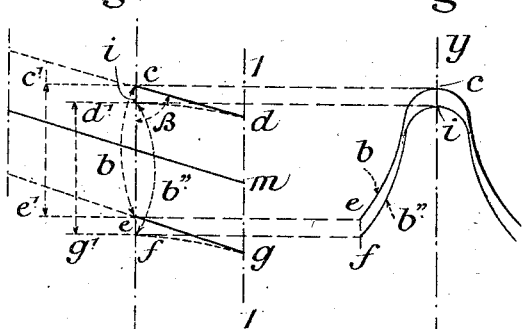
Figs. 3 and 4 are diagrammatic views showing projections of a cutter tooth upon a plane perpendicular to the axis of the cutter and upon a plane parallel to the cutting face of the tooth, respectively.

The surface of each cutter tooth according to this invention is that of a portion of a conoid generated by a straight line $a\ m$ remaining perpendicular to the axis $o$ of the cutter and sliding on the one hand upon the fixed straight line $a$ parallel to the axis $o$, and on the other hand upon a fixed profile $b$ whose shape depends upon the profile of the work to be cut (Figs. 3 and 4).

In this example it is supposed that the profile $b$ is situated in a plane $o\ c$ passing through the axis $o$; this profile is in this case exactly similar to the desired profile of the work to be cut by the tool.

Fig. 3 indicates, besides the plane $o\ c$, a plane 1, 1, parallel to the latter and representing the position of the cutting face of the milling cutter after a certain number of successive sharpenings of the latter.

This plane 1, 1, gives rise in the conoid surface to a profile of intersection $d\ g$, which is different from the profile $b$. By passing along this profile a surface of revolution concentric to the axis $o$, this surface will intersect the radial plane $o\ c$ according to a profile $b^1$ which represents the profile of the surface cut by the tooth when the latter is sharpened according to the plane 1, 1.

The following example will indicate the method of proceeding in order to determine the position of the straight line $a$, having given the initial radius of the milling cutter, the profile $b$ to be obtained, and the cutting angle $\beta$. The profile $b$ is first drawn, which is for instance symmetrical with reference to a plane perpendicular to the axis $o$ of the cutter; parallel to $o\ y$ is drawn the radius $o\ c$ (Fig. 3), and also the generatrix $c\ d$ passing through $c$ and making the angle $\beta$ with $o\ c$; the line 1, 1 is also drawn (Fig. 3) parallel to $o\ c$ and at a distance from $o\ c$ equal to the maximum allowable wear of the cutter tooth; the line 1, 1, will intersect $c\ d$ at the point $d$. From $o$ as a center, an arc is drawn passing through $d$ and intersecting $o\ c$ at $i$; in this case, $c\ i$ will represent the diminution of the cutter radius after the wear. From the point $e$ of $b$ (Fig. 4)

the line $e\,f$ is drawn parallel to $o\,y$ and to $o\,i$ then $e$ and $f$ are projected upon $o\,c$ (Fig. 3); from $o$ as center an arc of a circle is drawn through $f$ (Fig. 3) intersecting 1, 1, at $g$; lastly, a straight line is drawn through $e$ and $g$ which meets the extension of $c\,d$ at $a$. This latter point belongs to the straight line $a$ which is sought for and which is to be employed to constitute the conoid.

It will be observed on the one hand that the points $e$ and $g$ of the conoid are situated in the same plane parallel to the plane $o\,y$ and on the other hand that $e\,f = c\,i$, and therefore after the tooth is worn down, the radii $o\,i$ and $o\,f$ of the circumference described by the points $d$ and $g$ of the last cutting face will be shorter than the radii $o\,c$ and $o\,e$ of the corresponding points of the initial cutting face, by the same amount, this being a necessary condition in order that the profiles cut by the initial cutting face containing the points $c$ and $e$, and by the last cutting face produced by the last sharpening operation and containing the points $d$ and $g$, shall be absolutely the same, and in like manner that the profiles cut by the intermediate cutting faces produced by successive sharpening operations parallel to $o\,c$ shall have the constant value such as is required under the conditions of current practice.

It is not an essential feature that the initial cutting face should be situated upon the plane $o\,c$ passing through the axis of the milling cutter, and it can be located in front or in the rear of this plane. Neither is it required in order to guide the straight line $a\,m$, to make use of a directrix profile situated in the plane $o\,c$, and it is evident that any other suitable profile can be chosen which is drawn upon the conoid.

Several special cases are to be considered as regards the values which are given, as follows:

1. To the initial spacing or pitch angle such as $\gamma$, at the top of the milling cutter.

2. To the cutting angle of the cutting faces, such as $\beta$.

3. To the length of tooth employed in practice for successive sharpening operations with constant profile.

Fig. 5 shows the outline as indicated in Fig. 3.

The rectilinear directrix is situated at a finite distance in front of the tooth.

Fig. 6 is an alternative form of this outline, in which the rectilinear directrix $a$ is situated at a finite distance in front of the tooth which is greater than that represented in the outline of Fig. 5.

Fig. 7 is another alternative disposition in which the rectilinear directrix $a$ is located at an infinite distance in front or in the rear of the tooth.

Fig. 8 is another alternative form in which the rectilinear directrix $a$ is located at a finite distance in the rear of the tooth.

In all these figures, $o$ is the axis of the milling cutter, $c$ and $e$ are points on the profile of the initial cutting face of a tooth; $d$ and $g$ are points corresponding to the points $c\,e$ in the profile of the cutting face obtained by the last allowable sharpening of the tooth; $c\,d$ is the generatrix passing through the apex of the tooth and making with the radial plane $c\,o$ the angle corresponding to the desired pitch; $d$ and $g$ are located upon the generatrices passing through the points $c$ and $e$.

All these figures relate to the same milling cutter, taking as invariable quantities the angle $c\,o\,x$ corresponding to the desired pitch, and the length $c\,d$ which determines the length of tooth which can be practically ground to constant profile by successive sharpening operations effected parallel to the initial cutting face.

In all these cases, the surface of the tooth is generated by a straight line parallel to a plane perpendicular to the axis $o$, that is, parallel to the plane of the figure, and sliding at the same time upon the rectilinear directrix $a$ and upon the profile $c\,e$.

In case the direction of the plane $c\,e\,f$ of the initial cutting face with reference to the radial plane $c\,o$ should be given, and also the position of the plane $d\,g$ of the last sharpened face with reference to the initial cutting face; it will be possible in each case to determine geometrically the position to be given to the directrix $a$ in order to obtain the desired conditions of invariability for the profiles of the work to be cut. In all these cases, should the points of the cutting profiles $c\,e$, $d\,g$, be brought upon a radial plane such as $o\,x$ by displacements concentric to the axis $o$, care should be taken that $c^1\,d^1 = e^1\,g^1$. When the position of the three points $c\,d$ and $e$ is known, this condition will afford an easy determination of the position of the fourth point $g$, and the point $a$ can be then plotted at the intersection of the extensions of $d\,e$ and $g\,e$.

By gradually varying the angle $o\,c\,f$ from zero (Fig. 5) in the direction of the arrow, it will be observed that the rectilinear directrix $a$ moves away toward the left (Fig. 6) and continuing this movement to the left to an infinite distance, it passes to an infinite distance to the right (Fig. 7) and then returns to a finite distance to the right (Fig. 8).

The displacements of the position of the rectilinear directrix $a$ are entirely due, in each of these figures, to the value which is given to the angle $o\,c\,f$. Similar displacements of this rectilinear directrix $a$ would be occasioned by varying the values of the angle $c\,o\,x$ and the length $c\,d$. The position of the rectilinear directrix $a$ is therefore a function of the values given to the angle $c\ o\ x$, the angle $o\ c\ f$ and the length $c\ d$. It will therefore be possible to obtain an alternative form of Fig. 7 in which, for a given value of the angle $c\ o\ x$ and the length $c\ d$, the rectilinear directrix $a$ will move to infinity when the plane containing the initial cutting face $c\ e$ passes through the axis $o$. The angle $o\ c\ f$ will be equal to zero.

In the particular case in which the rectilinear directrix is situated at infinity, the surface of the tooth has the form of a cylinder either of whose profiles $c\ d$ and $e\ g$ can be taken as directrix.

Milling cutters with longitudinal profile of the tooth in the rectilinear sense and conoidal surface according to the present invention possesses various points of superiority over the current types of tool. The rectilinear setting, the value of the setting angle, and the value of the cutting angle such as $\beta$ (these two angles being judiciously chosen and combined according to the case), will provide a sharp and a perfectly free edge for the cutting members of the milling tool and will confer upon it cutting facilities of a well-defined character. The milling cutter can therefore operate under the best conditions of speed as well as sharpness of the work produced.

The stout form of the teeth and the conoidal conformation of the tooth surface which secures the requisite constancy of the profile obtained by sharpening the front of the cutting faces, will afford means for operating under the best conditions of output regular working and durability.

According to the modification shown in Figs. 9 to 12, cut-out parts are provided in the surface of each tooth. These cut-out parts have the form of shallow grooves of either curved or rectilinear section and disposed either parallel to the generatrices of the conoid or in any other direction making a suitable angle with the radii of the milling cutter. The positions of these parts are alternated or properly staggered from one tooth to the following, whereby during the whole or part of a revolution, the superposition of the partial profiles of the cutting faces operative during this rotation shall constitute the full and entire profile.

This arrangement facilitates the work of the cutter, by reducing the developed length of cut actually effected by each tooth, and by dividing up this length into several parts whereby the chip or turning shall be broken up. For a given amount of motive power, the cutter can be given a greater forward movement per unit of time and a greater amount of penetration into the work under operation, resulting in an increased output of work as well as a practical suppression of jumping of the tool or gripping in the work, such as is liable to occur with the full-cutting tool having teeth of continuous profile.

In the milling cutter here represented which has an even number of teeth, for instance 14 teeth, all the odd numbered teeth such as $a^1$ contain a series of cut-out parts 1, 2, 3, 4, 5, 6 (Fig. 11) and all the even numbered teeth such as $a^2$ have a series of cut-out parts 1′, 2′, 3′, 4′, 5′, 6′ (Fig. 12).

These cut-out parts are so disposed that the solid portions such as $h, i, j, k, l, m$ (Fig. 11) and $h', i', j', k', l', m'$ (Fig. 12) which remain after cutting away the profiles of the teeth in question, shall entirely cover the respective cut-out parts 1′, 2′, 3′, 4′, 5′, 6′ and 1, 2, 3, 4, 5, 6 when the profiles are exactly superposed. These cut-out portions have a depth which is at least equal to the maximum thickness determined for the chip removed by each tooth per revolution of the cutting tool.

Under these conditions each tooth will remove during the work a chip which is divided into as many portions as the tooth contains full or solid parts, this affording an advantage in the milling operations, and on the other hand, since the total sum of the solid parts $h, i, j, k, l, m$, and $h', i', j', k', l', m'$ covers the total sum of the empty spaces or cut-out parts 1′, 2′, 3′, 4′, 5′, 6′ and 1, 2, 3, 4, 5, 6, the traces left by the cut-out parts of each tooth will be removed by the solid portions of the succeeding tooth; moreover, the profile cut in the work will represent exactly, and without discontinuity, the profile employed for laying out the surface of the cutter teeth (Fig. 10).

It will also be observed that the cut-out parts which act to divide up the surface of the teeth, instead of being alternated upon adjacent teeth, can be distributed in any other suitable manner over the series of teeth, the only condition required being that the total sum of the traces or marks left by the cut-out parts shall be entirely covered by the total sum of the solid portions.

Figure 13:
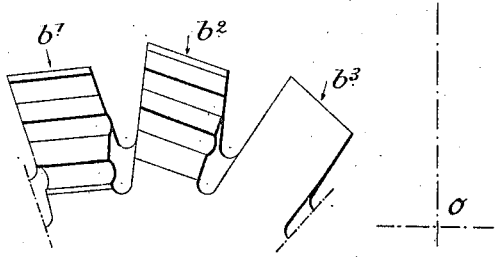
Fig. 13 is a partial elevation of the third form of the milling cutter.

The type represented by way of example in Fig. 13 is a combination, upon the same milling cutter, of solid teeth with the cut-out teeth as herein described. The tool thus constructed has a certain number of cut-out teeth such as $b^1$ and $b^2$ (Fig. 13) and a certain number of solid teeth with continuous profile such as $b^3$. The tool here represented has a number of teeth which is a multiple of 3, or 15 teeth for instance, and contains 5 groups of 3 teeth each, constituted as follows:

One tooth of the cut-out type, $b^1$.
One tooth of the cut-out type, $b^2$.
One tooth of the solid type with continuous profile, $b^3$.

In all these groups, the teeth $b^1\ b^2\ b^3$ follow each other regularly in the same order.

Any other suitable arrangement can be adopted, depending upon the number of cutter teeth, the divisibility of this number, and the predominance to be given to the solid or the cut-out teeth. Upon each tooth the cut-out parts situated on one of the sides can be disposed so as to face the solid portions situated on the opposite side or to face the cut-out parts of this latter side, or again, one side of the tooth can be plain and the other side provided with cut-out parts.

Claims.

1. A milling cutter whereof the teeth have the lateral faces in the form of regulated surfaces with generatrices situated parallel to a plane perpendicular to the axis of the cutter, characterized in that the surface of each tooth has the form of a portion of a conoid whereof the generatrices intersect a directrix whose form corresponds to the profile to be cut and a rectilinear directrix parallel to the axis of the cutter.

2. A milling cutter whereof the teeth have the lateral faces in the form of regulated surfaces with generatrices situated parallel to a plane perpendicular to the axis of the cutter, characterized in that the cutting face of each tooth is initially disposed in such manner that its prolongation will extend at a certain distance forwardly of the center of the cutter and is intended to be sharpened parallel to itself.

In testimony, that we claim the foregoing as our invention, we have signed our names in presence of two subscribing witnesses.

CHARLES BONNAFFOUS.
PIERRE BOZONNET.

Witnesses:
  CLEMENT S. EDWARDS,
  MAURICE ROUX.